Inventor
A. F. Gillet
Attorney

Patented Dec. 1, 1936

2,062,571

UNITED STATES PATENT OFFICE 2,062,571

DUAL RESONATOR

Alexis F. Gillet, Omaha, Nebr., assignor to Jubilee Manufacturing Co., Omaha, Nebr., a corporation of Nebraska Application June 15, 1935, Serial No. 26,792

1 Claim. (Cl. 116—137)

This invention relates to dual resonators for use in conjunction with an audible automobile signal such as is shown and described in my co-pending application, Serial No. 12,668 filed March 23, 1935.

Resonators for dual tone automobile signals are necessarily comparatively elongated, their length requiring a horizontal position with respect to and under the hood of an automobile engine on account of the limited vertical distance between the top of said engine and said hood, said horizontal position is also required in order to direct the sound in parallelism with the line of travel of the vehicle. The usual place of attachment of a resonator to an engine being on and to a stud bolt at the rear end of the engine, a bracket arm being employed for this purpose, the larger and heavier ends of the resonators being unsupported and with the result that heretofore, incident to vibration generated by the operation of the engine and applied to said bracket, the free ends of the resonators sway, their narrower ends becoming severed from their normal mounting on or attachment to their sound box mechanism.

An object of the present invention is to provide spaced apart resonators so shaped and arranged that they are adequately reinforced with respect to each other and adapted to resist stresses.

Another object of the invention is to provide an article of manufacture for the purposes stated cut or formed from a single sheet of metal for reducing the manufacturing cost thereof to a minimum and so reinforced and arranged that the resonators thereof are prevented from becoming deformed or disarranged in use, incident to vibration generated by an automobile and particularly the engine thereof.

A further object of the invention is to provide resonators locked together during manufacture in a fixed relation with respect to each other for facilitating the operation of attaching the resonators to a sound box of any conventional type, it being understood that said resonators are saleable separately from said sound boxes.

Other objects and advantages of the invention will be described hereinafter and will be particularly pointed out in the appended claim.

The inventive idea involved is capable of receiving a variety of mechanical expressions, some modifications of which, for the purpose of illustrating the invention, are shown in the accompanying drawing, wherein.

Figure 2:
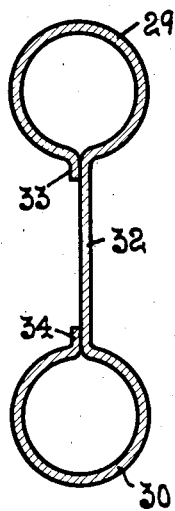
Figure 2 is a transverse section taken on line 2—2 of Figure 1 and showing the preferred embodiment of the invention.
Figure 3:
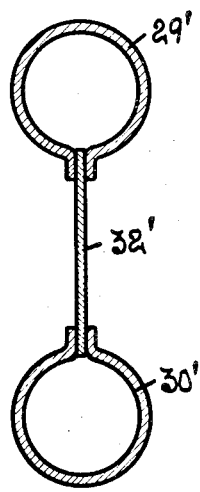
Figure 4:
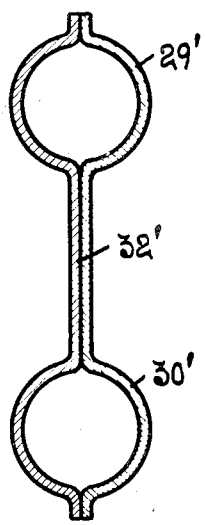
Figure 5:
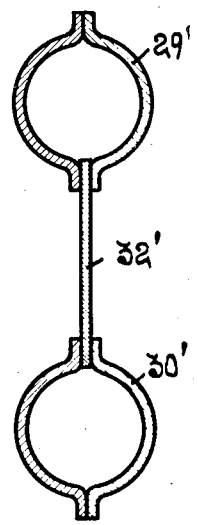

Figures 3 to 5 inclusive are views similar to Figure 2 and showing modifications thereof.

Referring to the drawing, 20 indicates an internal combustion engine provided with stud bolts having nuts 21 for securing the head thereof to the main body portion or block of said engine. A clip 22 is placed under the nut 21 and secured thereby, said clip being provided with a vertically disposed arm 23 carrying a bolt 24 to which an audible warning signalling mechanism or sound box 25 is attached. The sound box is provided with a conduit 26 adapted to be placed in communication with a source of suction such as the intake manifold of the engine for generating sounds within the box in conjunction with the mechanism of the latter at times when a valve within the sound box is opened by means of a flexible member 27. The member 27 extends to a point adjacent the driver's seat and may be pulled for opening the valve and applying suction to the sound box. The mechanism within the sound box is adapted to produce a plurality of tones of different pitch which may be communicated to the atmosphere through the sound outlets 28 of the box.

Figure 1:
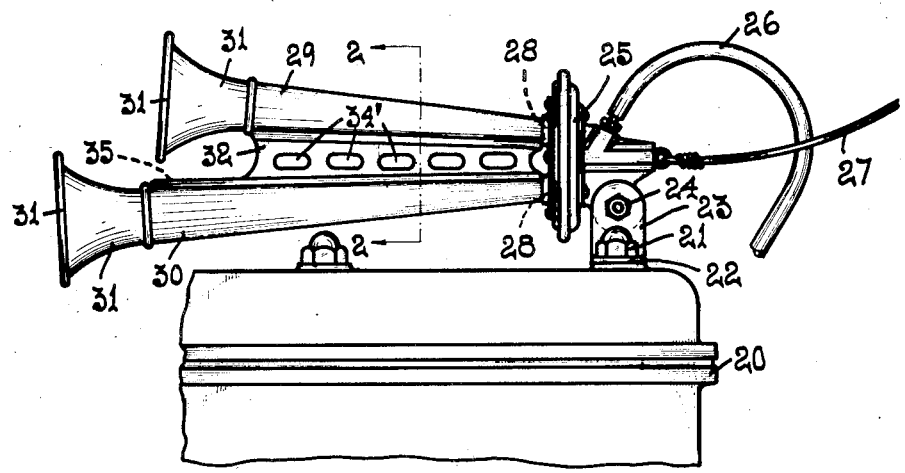
Figure 1 is a side view of the resonators embodying the present invention applied to a warning signal mechanism, said resonators being disposed in a normal horizontal position with respect to a fragment of an engine block.

Means for amplifying said tones comprising the resonators of the present invention are secured to the box by any suitable means such as is shown in Figure 1. The resonators are of unequal lengths, the shorter one 29 being in communication with the outlet for the tone of higher pitch and is preferably disposed above the longer resonator 30. The resonators may be provided with ornamental bells 31 joined to the ends thereof if desired and for practical use said bells may be dispensed with.

The preferred embodiment of the invention is formed from a single sheet of metal. The first step is to cut by means of a blanking die said sheet to provide a configuration in plan suitable in marginal outline and proportional to the length and diameter of resonators desired, and in accordance with the distance apart of the sound outlets of the sound box to which the resonators are intended to be applied.

The said configuration is now formed by means of die operations over mandrels to a cross-sectional shape as shown in Figure 2, providing the spaced apart resonators having a web 32 therebetween, said web being integral with said resonators, the longitudinal side edges of said configuration being bent in parallelism with said web providing ribs 33 and 34, said web having a forwardly projecting portion 35 aligned with the rib 34.

The ribs 33 and 34 are now "seam welded" to the web and said portion 35 thereof, an electrical welding machine being employed for this purpose and for providing longitudinally sealed resonators open at their opposite ends.

The web 32 may be incised providing apertures 34' for lightening the construction.

The modifications shown in Figures 3, 4, and 5 are respectively of three, two and five piece construction, the separate parts of each being welded together and which in use, while efficient, are more costly in manufacture, said modifications each having a web 32' between their spaced apart elongated resonators 29' and 30'.

In use the smaller ends of the resonators are applied to or attached to a sound box in communication with the outlets of the latter, said ends being spaced apart, a wide bearing is provided for the mounting thereof which together with the joinder of said ends by means of the web provides a construction adapted to resist vibration and a separation of said members when placed in the position of use mentioned with respect to a vibrating engine.

It is obvious that various changes and modifications may be made in the details of construction and design of the above specifically described embodiment of this invention without departing from the spirit thereof, such changes and modifications being restricted only by the scope of the invention as herein claimed.

What is claimed is:

A dual resonator comprising a single sheet of metal bent adjacent the longitudinal edges thereof to provide a pair of spaced apart tapering resonators, that portion of the sheet between the resonators constituting a web, the longitudinal edges of the sheet being secured to the adjacent longitudinal edge portion of the web.

ALEXIS F. GILLET.